(12) United States Patent
Nate

(10) Patent No.: US 8,717,781 B2
(45) Date of Patent: May 6, 2014

(54) DIRECT CURRENT/DIRECT CURRENT CONVERTER, AND POWER SUPPLY APPARATUS AND ELECTRONIC DEVICE USING THE SAME

(75) Inventor: Satoru Nate, Kyoto (JP)

(73) Assignee: Rohm Co., Ltd. (JP)

( * ) Notice: Subject to any disclaimer, the term of this patent is extended or adjusted under 35 U.S.C. 154(b) by 286 days.

(21) Appl. No.: 13/360,844

(22) Filed: Jan. 30, 2012

(65) Prior Publication Data

US 2012/0195075 A1 Aug. 2, 2012

(30) Foreign Application Priority Data

Jan. 28, 2011 (JP) .................................. 2011-017217

(51) Int. Cl.
*H02M 3/335* (2006.01)
*H02H 7/122* (2006.01)

(52) U.S. Cl.
USPC ................... 363/21.01; 363/21.07; 363/56.01

(58) Field of Classification Search
CPC .. H02M 1/36; H02M 3/335; H02M 2001/003
USPC ............ 363/21.01–21.09, 21.1, 21.11–21.15, 363/21.18, 56.01–56.08
See application file for complete search history.

(56) References Cited

U.S. PATENT DOCUMENTS

| | | | |
|---|---|---|---|
| 4,450,514 A * | 5/1984 | Peruth ............................. | 363/37 |
| 5,684,391 A * | 11/1997 | Weinfurtner et al. ......... | 323/282 |
| 8,125,799 B2 * | 2/2012 | Zhu et al. ................... | 363/21.14 |
| 2007/0159143 A1 * | 7/2007 | Yang .............................. | 323/247 |
| 2007/0171682 A1 * | 7/2007 | Yang et al. ...................... | 363/20 |
| 2008/0266907 A1 * | 10/2008 | Kim et al. .................... | 363/21.1 |
| 2009/0168463 A1 * | 7/2009 | Zhao et al. ................. | 363/21.04 |
| 2010/0135048 A1 * | 6/2010 | Nagai et al. ................ | 363/21.01 |
| 2010/0265231 A1 * | 10/2010 | Jang ............................. | 345/211 |
| 2011/0273912 A1 * | 11/2011 | Kim et al. .................. | 363/21.09 |
| 2012/0147631 A1 * | 6/2012 | Nate ......................... | 363/21.15 |
| 2012/0188802 A1 * | 7/2012 | Kim et al. .................. | 363/21.18 |

FOREIGN PATENT DOCUMENTS

| | | | |
|---|---|---|---|
| JP | 02-211055 | A | 8/1990 |
| JP | 2-211055 | A | 8/1990 |
| JP | 09-098571 | A | 4/1997 |
| JP | 9-98571 | A | 4/1997 |

* cited by examiner

*Primary Examiner* — Timothy J Dole
*Assistant Examiner* — Yusef Ahmed
(74) *Attorney, Agent, or Firm* — Cantor Colburn LLP

(57) ABSTRACT

A direct current (DC)/DC converter capable of lowering power consumption and capable of being started in a short time is provided. A voltage generated at a second output capacitor is input to a power supply terminal. An input voltage is input to a high voltage terminal. A charging transistor is a N-channel Metal Oxide Semiconductor Field Effect Transistor disposed between the high voltage terminal and the power supply terminal and applied with a bias so that the charging transistor is normally on. In a first state, in which the voltage of the power supply terminal is lower than a specified first threshold voltage, a current limiting circuit limits a charging current flowing from the high voltage terminal to the power supply terminal, and in a second state in which the voltage is higher than a second threshold voltage, the current limiting circuit lowers the charging current substantially to zero.

17 Claims, 6 Drawing Sheets

US 8,717,781 B2

DIRECT CURRENT/DIRECT CURRENT CONVERTER, AND POWER SUPPLY APPARATUS AND ELECTRONIC DEVICE USING THE SAME

BACKGROUND OF THE INVENTION

1. Field of the Invention

The invention relates to a direct current (DC)/DC converter.

2. Description of the Related Art

Various home appliances including mainly TV sets and refrigerators, or various electronic devices including mainly laptop computers, mobile phone terminals and Personal Digital Assistants (PDAs) operate by receiving external power, and batteries therein can be charged by power from an external power supply. In addition, in the home appliances and the electronic devices (generically referred to as electronic devices hereinafter), a power supply apparatus for AC/DC (alternating current/direct current) conversion of a commercial AC voltage is disposed, or the power supply apparatus is disposed in an external power supply adaptor (AC adaptor) of the electronic devices.

The power supply apparatus includes a rectifier circuit (a diode bridge circuit) for rectifying an AC voltage, and an insulated DC/DC converter for reducing the rectified voltage and supplying the reduced voltage to a load.

FIG. 1 shows a structure of a DC/DC converter 100r studied by the inventors of the invention. A specific structure of the DC/DC converter 100r cannot be considered as an ordinary technology well known to those skilled in the art.

A DC input voltage $V_{IN}$ from a rectifier circuit (not shown in the drawings) disposed in a front part of the DC/DC converter 100r is input to an input terminal P1 of the DC/DC converter 100r. The DC/DC converter 100r reduces the input voltage $V_{IN}$ and supplies the reduced input voltage $V_{IN}$ to a load connected to an output terminal $P_{OUT}$.

The DC/DC converter 100r mainly includes a switch transistor M1, a transformer T1, a first diode D1, a first output capacitor Co1, a control circuit 10r, and a feedback circuit 20r. In the DC/DC converter 100r, a primary side region and a secondary side region of the transformer T1 must be electrically insulated. The feedback circuit 20r includes resistors R1 and R2 for dividing an output voltage $V_{OUT}$, a shunt regulator 22, and an optical coupler 24.

The shunt regulator 22 is an error amplifier for amplifying an error between a divided output voltage $V_{OUT}'$ and a reference voltage $V_{REF}$ corresponding to a target value of the output voltage $V_{OUT}$. The optical coupler 24 feeds a feedback signal corresponding to the error between the output voltage $V_{OUT}$ and the target voltage back to the control circuit 10r. The control circuit 10r controls a duty ratio of the on/off of the switch transistor M1 by using pulse modulation, so that the output voltage $V_{OUT}$ is made to be in consistent with the target value.

The control circuit 10r can operate at a power supply voltage $V_{CC}$ of about 10 V, and if the input voltage $V_{IN}$ (about 140 V) is used to drive the control circuit 10r, the efficiency is deteriorated. In addition, the voltage $V_{OUT}$ reduced by the DC/DC converter 100r is generated on the secondary side of the transformer T1, and thus the voltage $V_{OUT}$ cannot be supplied to the control circuit 10r disposed on the primary side.

Therefore, an auxiliary coil L3 is disposed on the primary side of the transformer T1. The auxiliary coil L3, the second diode D2, and the second output capacitor Co2 function as an auxiliary DC/DC converter for generating the power supply voltage $V_{CC}$ for the control circuit 10r. In the DC/DC converter 100r, the power supply voltage $V_{CC}$ is proportional to the output voltage $V_{OUT}$, and a proportionality factor is dependent on a ratio of number of turns of the secondary coil L2 to the auxiliary coil L3 of the transformer T1.

$$V_{CC}=V_{OUT} \times N_D/N_S$$

Wherein, $N_S$ is the number of turns of the secondary coil L2, and $N_D$ is the number of turns of the auxiliary coil L3.

Patent Document 1: Japanese Patent Publication No. 1997-098571

Patent Document 2: Japanese Patent Publication No. 1990-211055

SUMMARY OF THE INVENTION

The inventors of the invention study a starting action of the DC/DC converter 100r, and become aware of the following subject. The starting action is described. The input voltage $V_{IN}$ is supplied to the input terminal P1. The capacitor Co2 is charged by the input voltage $V_{IN}$ via a resistor R11, so as to elevate the power supply voltage $V_{CC}$. Then, if the power supply voltage $V_{CC}$ reaches a threshold voltage $V_{UVLO}$ set in a control circuit 10r, the control circuit 10r can be started to operate, so as to start the switch of the switch transistor M1. Through the switch of the switch transistor M1 the auxiliary DC/DC converter including the auxiliary coil L3, the second diode D2, and the second output capacitor Co2 is used to stabilize the power supply voltage $V_{CC}$.

Herein, a time starting from the supplying of the input voltage $V_{IN}$ to the starting of the control circuit 10r depends on a time starting from the supplying of the input voltage $V_{IN}$ to the reaching of the power supply voltage $V_{CC}$ to the threshold voltage $V_{UVLO}$, that is, depend on a time constant specified by the resistor R11 and the capacitor Co2. Therefore, the lower the resistance of the resistor R11 is, the shorter the starting time will be, and the higher the resistance of the resistor R11 is, the longer the starting time will be. In addition, after the control circuit 10r is started, the resistor R11 consumes a surplus power. The higher the resistance R11 is, the smaller the surplus power consumption caused by the resistor R11 will be, and the lower the resistance R11 is, the larger the surplus power consumption caused by the resistor R11 will be. That is to say, in the DC/DC converter 100r shown in FIG. 1, a corresponding relation exists between the starting time and the power consumption.

An embodiment of the invention is implemented in light of the subject. One of the exemplary objectives thereof is to provide a DC/DC converter which can reduce power consumption and can be started in a short time.

An embodiment of the invention relates to a DC/DC converter. The DC/DC converter includes: a transformer, including a primary coil having one terminal applied with an input voltage, a secondary coil, and an auxiliary coil disposed on the side of the primary coil; a first output capacitor, having one terminal with a fixed electric potential, and the other terminal connected to an output terminal; a first diode, having a cathode facing the first output capacitor and disposed between the other terminal of the first output capacitor and one terminal of the secondary coil; a switch transistor, disposed in a path of the primary coil; a second output capacitor, having one terminal with a fixed electric potential; a second rectifier element, having a cathode facing the second output capacitor and disposed between the other terminal of the second output capacitor and one terminal of the auxiliary coil; and a control circuit, for controlling the on/off of the switch transistor. The control circuit includes a power supply terminal, connected to the other terminal of the second output capacitor; a high voltage terminal, input the input voltage; a charging transistor, being a N-channel Metal Oxide Semiconductor Field Effect Transistor (MOSFET) that is disposed between the high voltage terminal and the power supply terminal and applied with a bias so that the charging transistor is normally on; and a current limiting circuit, for limiting a charging current flowing from the high voltage terminal through the charging transistor to the power supply terminal in a first state in which the voltage of the power supply terminal is lower than a specified first threshold voltage, and lowering the charging current substantially to zero in a second state in which the voltage of the power supply terminal is higher than a second threshold voltage that is specified to be higher than the first threshold voltage.

According to the embodiment, after the DC/DC converter is just started, the second output capacitor is immediately charged by the current flowing from the high voltage terminal through the charging transistor to the power supply terminal. Moreover, in case that the current limiting circuit is ignored, the lower the voltage of the power supply terminal is, the higher the charging current will be. Therefore, after the DC/DC converter is just started, the second output capacitor can be immediately charged with a high charging current when the voltage of the power supply terminal is low, so that a starting time is shortened. Moreover, when the voltage of the power supply terminal is higher than the second threshold voltage, the charging current is made substantially to become zero by the current limiting circuit, so that a consumed current is lowered. In addition, in case that the current limiting circuit is absent, if the power supply terminal is grounded, the current flowing from the high voltage terminal to the power supply terminal is very high. However, in the embodiment, when the voltage of the power supply terminal is lower than the first threshold voltage, the charging current is limited by the current limiting circuit, and thus the circuit is protected.

The current limiting circuit can further include a bypass switch, disposed in a path of the charging current between the high voltage terminal and the power supply terminal; and a first current source, for supplying a specified current to the power supply terminal. Alternatively, in the first state, the bypass switch is turned off, and the first current source is turned on; in the second state, the bypass switch and the first current source are both turned off; and in a third state in which the voltage of the power supply terminal is higher than the first threshold voltage and lower than the second threshold voltage, at least the bypass switch is turned on.

According to the embodiment, in the first state, the charging current flowing from the high voltage terminal to the power supply terminal is limited to be a current level generated by the first current source. Moreover, in the second state, the charging current is substantially zero, and in the third state, the higher the voltage of the power supply terminal is, the lower the charging current will be.

The control circuit can further include a first diode, having a cathode facing the power supply terminal and disposed between the current limiting circuit and the power supply terminal.

The first current source can further include a first transistor, disposed in a path of a reference current; a second transistor, connected to the first transistor to form a current mirror circuit, and disposed between the high voltage terminal and the power supply terminal; and a control switch, connected to the second transistor in series and disposed between the high voltage terminal and the power supply terminal.

The bypass switch can further include a third transistor, being a NPN type bipolar transistor disposed in a path between the high voltage terminal and the power supply terminal; and a bias circuit, for controlling a base current of the third transistor.

The bias circuit can further include a fourth transistor, being a NPN type bipolar transistor disposed between a base and a collector of the third transistor; a second current source, disposed between the base of the third transistor and a ground terminal; a third current source, for supplying a current to a base of the fourth transistor; a first switch, disposed between the base of the fourth transistor and the ground terminal; and a second switch and a second diode, connected in series and disposed between the base of the fourth transistor and the ground terminal.

The current limiting circuit can further include a first comparator, for comparing the voltage of the power supply terminal with the first threshold voltage, to generate a first detection signal representing a comparison result; and a second comparator, for comparing the voltage of the power supply terminal with the second threshold voltage, to generate a second detection signal representing a comparison result. The state of the current limiting circuit can be controlled according to the first and second detection signal.

Another embodiment of the invention is a power supply apparatus. The power supply apparatus includes an AC/DC converter, for converting a commercial AC voltage into a DC voltage; and any form of a DC/DC converter, for receiving the DC voltage, reducing the DC voltage and supplying a reduced voltage to a load.

Another embodiment of the invention is an electronic device. The electronic device includes a micro-computer; and any form of a DC/DC converter, for supplying an output voltage to the micro-computer.

Additionally, any combination of the elements and elements or performance obtained through replacement of the elements or performance of the present invention in the method, the device, and the system can also serve as embodiments of the present invention.

Effect of the Invention

According to an embodiment of the invention, a DC/DC converter that can lower power consumption and can be started in a short time is provided.

PREFERRED EMBODIMENT OF THE INVENTION

Figure 1:
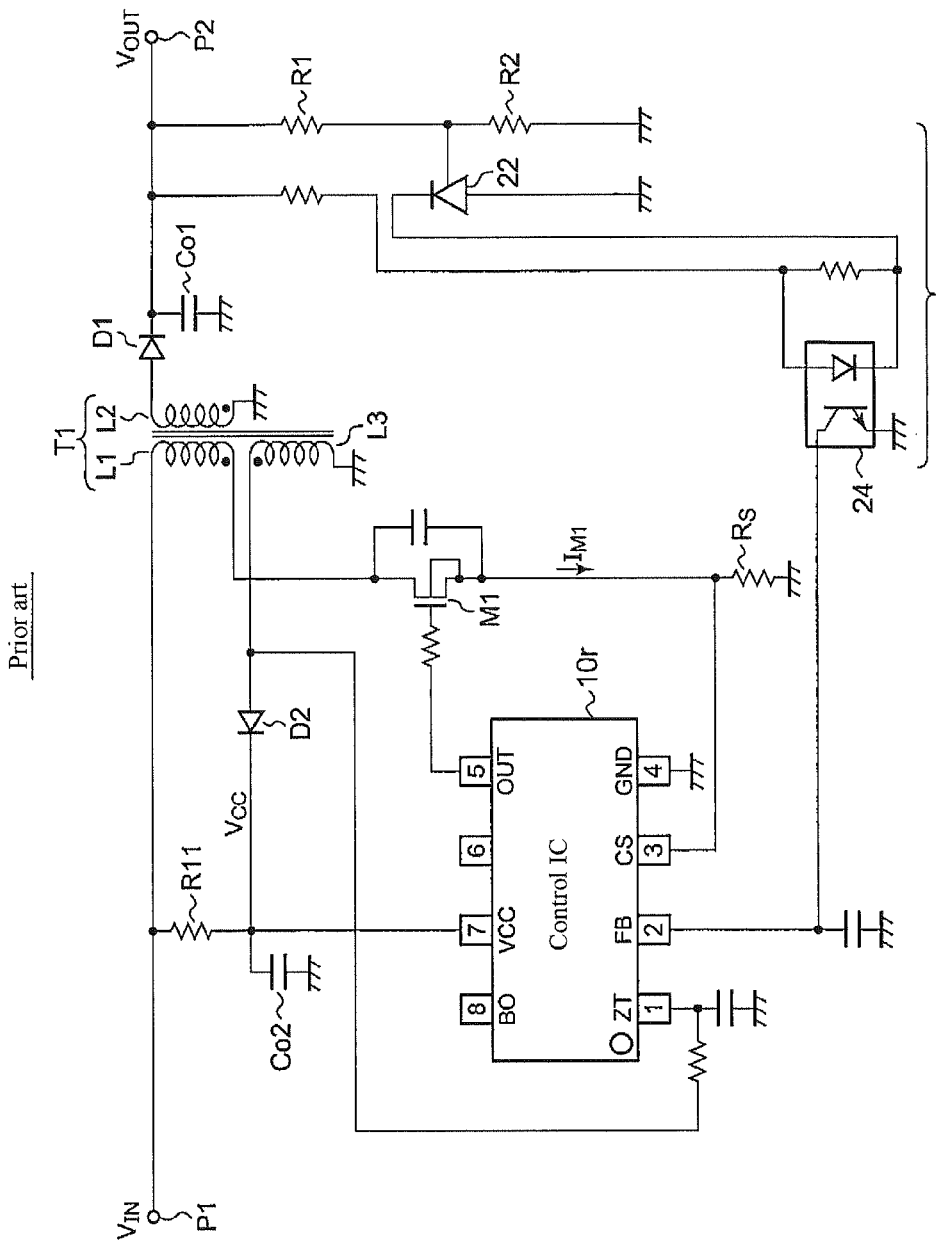
FIG. 1 shows a configuration of a DC/DC converter studied by the inventors of the invention.

Hereinafter, preferred embodiments of the present invention are described with reference to accompanying drawings. For the same or equivalent elements, components, and processes in the drawings, the same symbols are attached, and repeated descriptions are omitted. In addition, the embodiments exemplify, rather than limit the present invention. All features and combinations thereof mentioned in the embodiments are not essences of the invention.

In the specification, the so called "connection state between a component A and a component B" includes not only physically direct connection of the component A to the component B, but also the indirect connection of the component A to the component B via an other component without essentially affecting the electrical connection state between the components, or compromising the function and effects exerting by the combination the components.

Similarly, the so called "state in which a component C is disposed between the component A and the component B" includes, in addition to a situation that the component A and component C, or the component B and the component C are directly connected, a situation that the component A and component C, or the component B and the component C are indirectly connected via an other component without essentially affecting the electrical connection state between the components, or compromising the function and effects exerting by the combination of the components.

Figure 2:
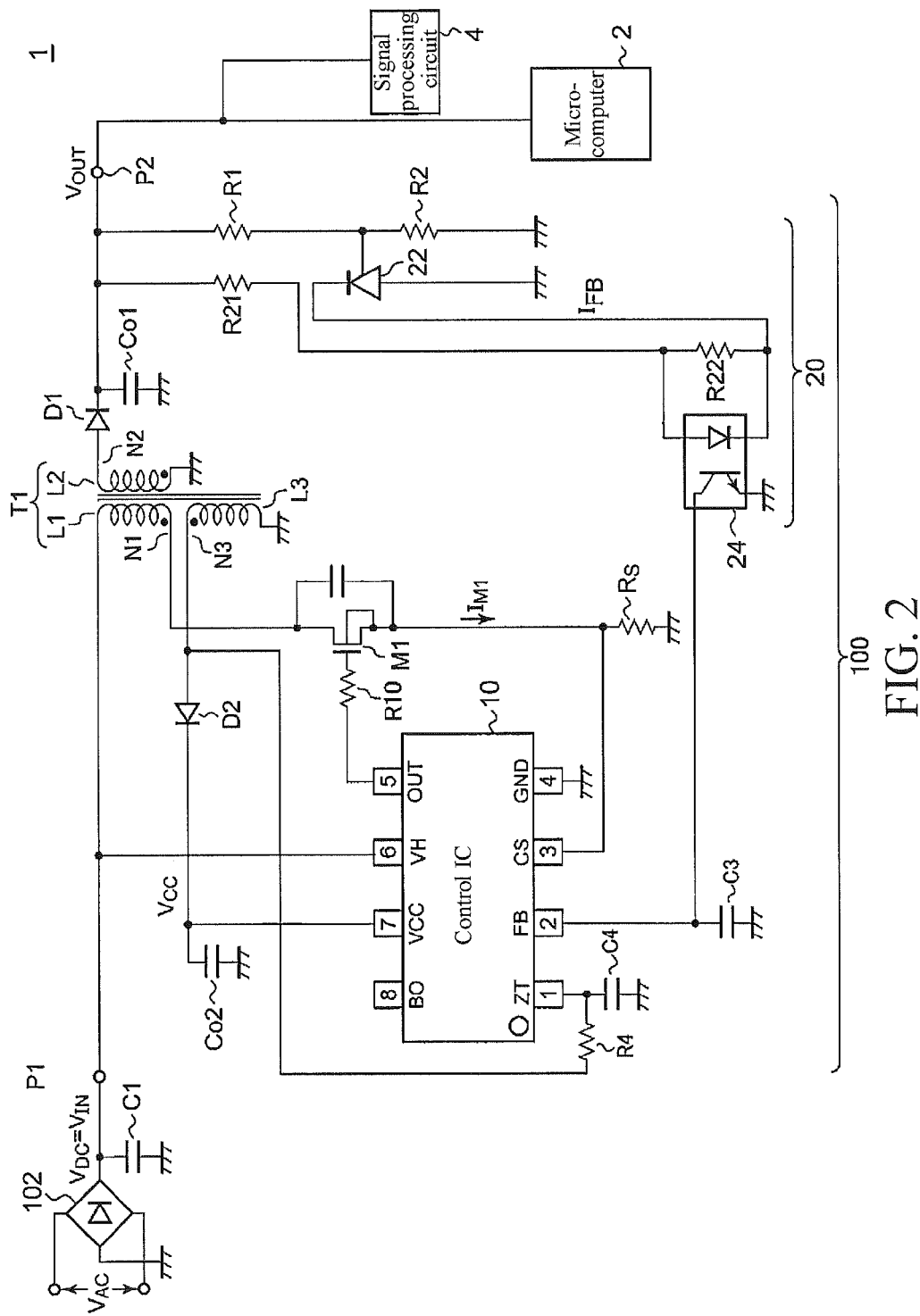
FIG. 2 is a circuit diagram showing a configuration of an electronic device according to an embodiment.

FIG. 2 is a circuit diagram showing a configuration of an electronic device 1 according to an embodiment.

The electronic device 1 is a home appliance, for example, a TV set, a refrigerator, or an air conditioner, or a computer. The electronic device 1 includes a micro-computer 2, a signal processing circuit 4, a DC/DC converter 100, and a rectifier circuit 102. The electronic device 1 is divided into a primary side and a secondary side that are insulated from each other. The rectifier circuit 102 and a part of the DC/DC converter 100 are disposed on the primary side, and the other part of the DC/DC converter 100, the micro-computer 2, and the signal processing circuit 4 are disposed on the secondary side.

The rectifier circuit 102 is, for example, a diode rectifier circuit, receives an AC voltage $V_{AC}$ such as a commercial AC voltage, and rectifies full wave of the AC voltage $V_{AC}$, which is smoothed by a capacitor C1, to generate a DC voltage $V_{DC}(=V_{IN})$. When $V_{AC}=100$ V, $V_{DC}=144$ V.

The DC/DC converter 100 receives a DC input voltage $V_{IN}$ at an input terminal P1, reduces the input voltage $V_{IN}$, and then outputs the input voltage $V_{IN}$ from an output terminal P2. A Power Factor Correction (PFC) circuit (not shown in the drawings) can be further disposed between the DC/DC converter 100 and the rectifier circuit 102. An output voltage $V_{OUT}$ from the output terminal P2 is output to the micro-computer 2 and the signal processing circuit 4. The micro-computer 2 comprehensively controls the electronic device 1 as a whole. The signal processing circuit 4 is a block for specific signal processing, and can be exemplified as, for example, an interface circuit for communicating with an external device, an image processing circuit, or a sound processing circuit. Definitely, in a practical electronic device 1, a plurality of signal processing circuits 4 are disposed according to the function of the electronic device 1.

The whole structure of the electronic device 1 is described above. Next, the DC/DC converter 100 used in the electronic device 1 is described.

The DC/DC converter 100 mainly includes a transformer T1, a first diode D1, a second diode D2, a first output capacitor Co1, a second output capacitor Co2, a switch transistor M1, a control circuit 10, and a feedback circuit 20.

The transformer T1 includes a primary coil L1, a secondary coil L2, and an auxiliary coil L3 disposed on the side of the primary coil. The number of turns of the primary coil L1 is set to $N_P$, and the number of turns of the secondary coil L2 is set to $N_S$. Moreover, the number of turns of the auxiliary coil L3 is set to $N_D$.

The switch transistor M1, the primary coil L1, the secondary coil L2, the first diode D1, and the first output capacitor Co1 form a first converter (a main converter). One terminal of the first output capacitor Co1 is grounded, and has a fixed electric potential. The first diode D1 has a cathode facing the first output capacitor Co1 and is disposed between the other terminal of the first output capacitor Co1 and one terminal N2 of the secondary coil L2. The other terminal of the secondary coil L2 is grounded and has a fixed electric potential.

The input voltage $V_{IN}$ is applied to one terminal of the primary coil L1. The switch transistor M1 is disposed in a path of the primary coil L1. A switch signal OUT from the control circuit 10 is input into a gate of the switch transistor M1 through a resistor R10.

The switch transistor M1, the primary coil L1, the auxiliary coil L3, the second diode D2, and the second output capacitor Co2 form a second converter (an auxiliary converter).

One terminal of the second output capacitor Co2 has a fixed electric potential. The second diode (a second rectifier element) D2 is disposed between the other terminal of the second output capacitor Co2 and one terminal N3 of the auxiliary coil L3. The other terminal of the auxiliary coil L3 is grounded, and has a fixed electric potential. The second diode D2 is configured so that a cathode faces the side of the second output capacitor Co2.

The second output capacitor Co2 generate a power supply voltage $V_{CC}$ corresponding to a ratio of number of turns ($N_D/N_S$).

$$V_{CC}=N_D/N_S \times V_{OUT} \quad (1)$$

A power supply terminal VCC (pin No. 7) of the control circuit 10 is connected to the second output capacitor Co2, which charges the second output capacitor Co2 immediately after being started, and receives the voltage (also referred to as power supply voltage) $V_{CC}$ generated in the second output capacitor Co2 after being started. The control circuit 10 controls the switch transistor M1 by adjusting a duty ratio of the switch signal OUT by using pulse width modulation (PWM) or pulse frequency modulation (PFM), so that a level of the output voltage $V_{OUT}$ is made to approach a target value. A method for generating the switch signal OUT is not particularly limited.

A feedback signal $V_{FB}$ corresponding to the output voltage $V_{OUT}$ is input to a feedback terminal FB (pin No. 2) of the control circuit 10 by the feedback circuit 20 including an optical coupler. A capacitor C3 is disposed for phase compensation.

For example, the feedback circuit 20 includes a shunt regulator 22, an optical coupler 24, and divider resistors R1, and R2. The divider resistors R1 and R2 divide the output voltage $V_{OUT}$ of the DC/DC converter 100 by a division ratio K. The shunt regulator 22 amplifies an error between a divided output voltage $V_{OUT}'(=V_{OUT} \times K)$ and a specified reference voltage ($V_{REF}$), and outputs a current $I_{FB}$ corresponding to the error. In a path of the output current $I_{FB}$ of the shunt regulator 22, a light emitting diode (LED) is disposed at an input side of the optical coupler 24. The optical coupler 24 outputs the feedback signal $V_{FB}$ corresponding to the error between the output voltage $V_{OUT}'$ and the reference voltage $V_{REF}$ to the terminal FB of the control circuit 10. Resistors R21 and R22 are disposed for properly biasing the LED of the optical coupler 24.

The control circuit 10 receives the feedback signal $V_{FB}$, and generates the switch signal OUT for adjusting the duty ratio so that the divided output voltage $V_{OUT}'$ is in consistent with the reference voltage $V_{REF}$, thereby driving the switch transistor M1.

When a division ratio of a divider circuit 26 is set to K, the output voltage $V_{OUT}$ is stabilized by meeting an equation below through feedback:

$$V_{OUT} = V_{REF}/K \qquad (2).$$

The input voltage $V_{IN}$ is applied to a high voltage terminal VH of the control circuit 10. As described below, the high voltage terminal VH and the power supply terminal VCC are connected via a charging path in the control circuit 10. In a period of time before the second converter operates normally, the power supply terminal VCC of the control circuit 10 is discharged via the charging path in the control circuit 10.

Then, an example of a specific configuration of the control circuit 10 is described.

For example, the control circuit 10 generates the switch signal OUT according to the output voltage $V_{OUT}$ generated in the first output capacitor Co1, a current $I_{M1}$ flowing through the switch transistor M1 (the primary coil L1) and a voltage $V_D$ generated in the one terminal N3 of the auxiliary coil L3.

A detection resistor Rs is disposed for detecting the current $I_{M1}$ flowing through the switch transistor M1. A voltage reduction (a detection signal) Vs generated in the detection resistor Rs is input to a current detection terminal (a CS terminal: pin No. 3) of the control circuit 10. Furthermore, a voltage $V_{D1}$ at a tap of the auxiliary coil L3 of the control circuit 10 is input to a ZT terminal (pin No. 1) via a low-pass filter including a resistor R4 and a capacitor C4.

Figure 3:
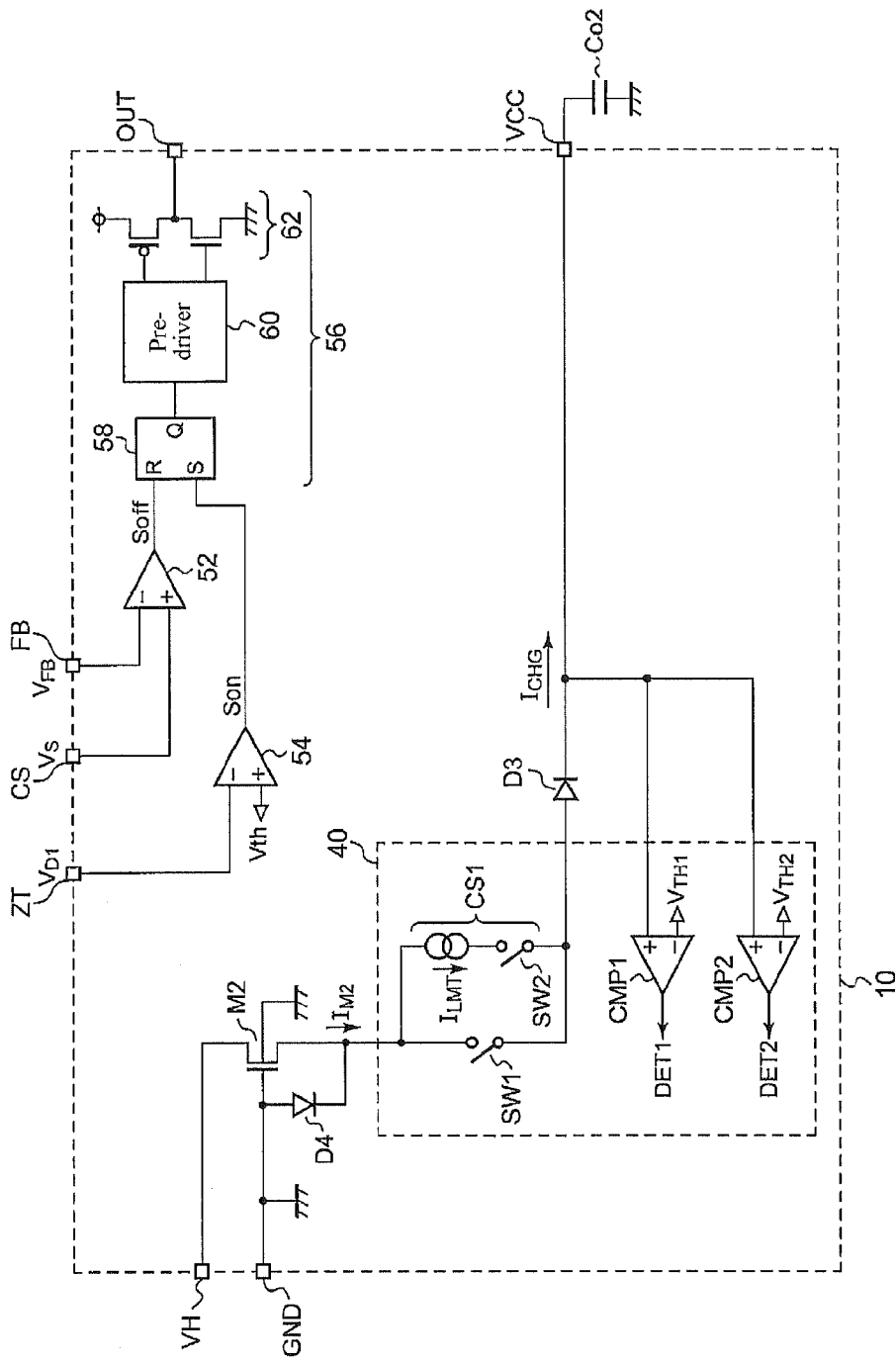
FIG. 3 is a circuit diagram showing an example of a configuration of a control circuit shown in FIG. 2.

FIG. 3 is a circuit diagram of an example of a configuration of the control circuit 10 shown in FIG. 2. The control circuit 10 includes an off signal generation portion 52, an on signal generation portion 54, a driving portion 56, a charging transistor M2, a current limiting circuit 40, and a diode D3.

The off signal generation portion 52 includes a comparator for comparing the detection signal Vs and the feedback signal $V_{FB}$, to generate an off signal Soff for specifying an off time of the switch transistor M1. If the current $I_{M1}$ flowing through the switch transistor M1 reaches a level corresponding to the feedback signal $V_{FB}$, the off signal Soff generated by the off signal generation portion 52 is asserted.

For example, if the output voltage $V_{OUT}'$ is lower than the reference voltage $V_{REF}$, the feedback signal $V_{FB}$ becomes high, a time at which the off signal Soff is asserted is postponed, and an on time Ton of the switch transistor M1 becomes long, so that a feedback is applied to elevate the output voltage $V_{OUT}$. In contrast, if the output voltage $V_{OUT}'$ is higher than the reference voltage $V_{REF}$, the feedback signal $V_{FB}$ becomes low, a time at which the off signal Soff is asserted become earlier, and an on time Ton of the witch transistor M1 become short, so that a feedback is applied to reduce the output voltage $V_{OUT}$.

The on signal generation portion 54 generates an asserted on signal Son after the off signal Soff is asserted. The on signal generation portion 54 in FIG. 3 includes a comparator for comparing the electric potential $V_D$ at the one terminal N3 of the auxiliary coil L3 with a specified level Vth. If the electric potential $V_D$ is reduced to the specified level Vth, the on signal generation portion 54 asserts the on signal Son.

If the switch transistor M1 is turned on, the current $I_{M1}$ flows through the primary coil L1, and energy is stored in the transformer T1. Subsequently, if the switch transistor M1 is turned off, the energy stored in the transformer T1 is released. The on signal generation portion 54 can detect a situation in which the energy in the transformer T1 is totally released by monitoring the voltage $V_D$ generated in the auxiliary coil L3.

After detecting the release of the energy, the on signal generation portion 54 asserts the on signal Son in order to further turn on the switch transistor M1.

The driving portion 56 turns on the switch transistor M1 after the on signal Son is asserted, and turns off the switch transistor M1 after the off signal Soff is asserted. The driving portion 56 includes a trigger 58, a pre-driver 60, and a driver 62. A set terminal and a reset terminal of the trigger 58 respectively receive the on signal Son and the off signal Soff. The trigger 58 changes a state according to the on signal Son and the off signal Soff. As a result, a duty ratio of an output signal Smod of the trigger 58 is modulated so that the output voltage $V_{OUT}$ is in consistent with the target value $V_{REF}$. In FIG. 3, a corresponding relation is established between a high level of the driving signal Smod and the switch signal OUT and the on of the switch transistor M1, and a corresponding relation is established between a low level of the driving signal Smod and the switch signal OUT and the off of the switch transistor M1.

The pre-driver 60 drives the driver 62 according to the output signal Smod of the trigger 58. A dead time is set for output signals SH and SL of the pre-driver 60 so that a high-side transistor and a low-side transistor of the driver 62 are not turned on at the same time. The switch signal OUT is output from the driver 62.

The charging transistor M2 is a N-channel MOSFET, which is disposed between the high voltage terminal VH and the power supply terminal VCC, and applied with a bias so that the charging transistor is normally on. Specifically, a gate and a back gate of the charging transistor M2 are connected to the ground terminal GND, and a drain of the charging transistor M2 is connected to the high voltage terminal VH. The diode D4 is connected between the grate and a source of the charging transistor M2. If the current limiting circuit 40 is ignored, the higher the voltage $V_{CC}$ of the power supply terminal VCC is, the smaller a current $I_{M2}$ flowing through the charging transistor M2 will be, and the lower the voltage $V_{CC}$ of the power supply terminal VCC is, the larger the current $I_{M2}$ will be.

The current limiting circuit 40 controls a charging current $I_{CHG}$ flowing from the high voltage terminal VH through the charging transistor M2 to the power supply terminal VCC. In a first state φ1 in which the voltage $V_{CC}$ of the power supply terminal VCC is lower than a specified first threshold voltage $V_{TH1}$, the current limiting circuit 40 limits the charging current $I_{CHG}$ to a certain limited current $I_{LMT}$. For example, if the limited current $I_{LMT}$ is a micro-current of about 200 μA-300 μA. In addition, in a second state φ2 in which the voltage $V_{CC}$ of the power supply terminal VCC is higher than a second threshold voltage $V_{TH2}$ that is specified to be higher than the first threshold voltage $V_{TH1}$, the charging current $I_{CHG}$ is reduced substantially to zero. The second threshold voltage $V_{TH2}$ can also be consistent with a minimum voltage $V_{UVLO}$ (UVLO: Under Voltage Lock Out) at which the control circuit 10 can operate.

More specifically, the current limiting circuit 40 includes a bypass switch SW1, a first current source CS1, a first comparator CMP1, and a second comparator CMP2. The first comparator CMP1 compares the voltage $V_{CC}$ of the power supply terminal VCC with the first threshold voltage $V_{TH1}$, to generate a first detection signal DET1 representing a comparison result. The second comparator CMP2 compares the voltage $V_{CC}$ with the second threshold voltage $V_{TH2}$, to generate a second detection signal DET2 representing a comparison result. The current limiting circuit 40 detects the first to three states according to the detection signals DET1 and DET2. That is to say, the first state φ1 is indicated when DET1 and DET2 are both at a low level, a second state φ2 is indicated when DET1 and DET2 are both at a high level, and the third state φ3 is indicated when DET1 is at a high level, and DET2 is at a low level.

The bypass switch SW1 and the charging transistor M2 are connected in series and disposed in a path of the charging current between the high voltage terminal VH and the power supply terminal VCC. The first current source (a limiting current source) CS1 is structured to be switched between on and off, and supplies the limited current $I_{LMT}$ to the power supply terminal VCC in the on state.

In the first state φ1, the bypass switch SW1 is turned off, and the first current source CS1 is turned on. As such, the charging current $I_{CHG}$ supplied to the second output capacitor Co2 is limited to be the limited current $I_{LMT}$.

In the second state φ2, the bypass switch SW1 and the first current source CS1 are both turned off. As such, the charging current $I_{CHG}$ is substantially zero.

In the third state φ3, at least the bypass switch SW1 is turned on. As such, the current limiting circuit 40 is in the on state, and the current $I_{M2}$ flowing through the charging transistor M2 is supplied as the charging current $I_{CHG}$ to the second output capacitor Co2. In this embodiment, in the third state φ3, the first current source CS1 is set to be off.

The charging transistor M2, the bypass switch SW1, and the diode D3 function as an auxiliary charging circuit for charging the second output capacitor Co2 after the DC/DC converter 100 is just started and before the auxiliary converter operates, to replace the auxiliary converter.

Figure 4:
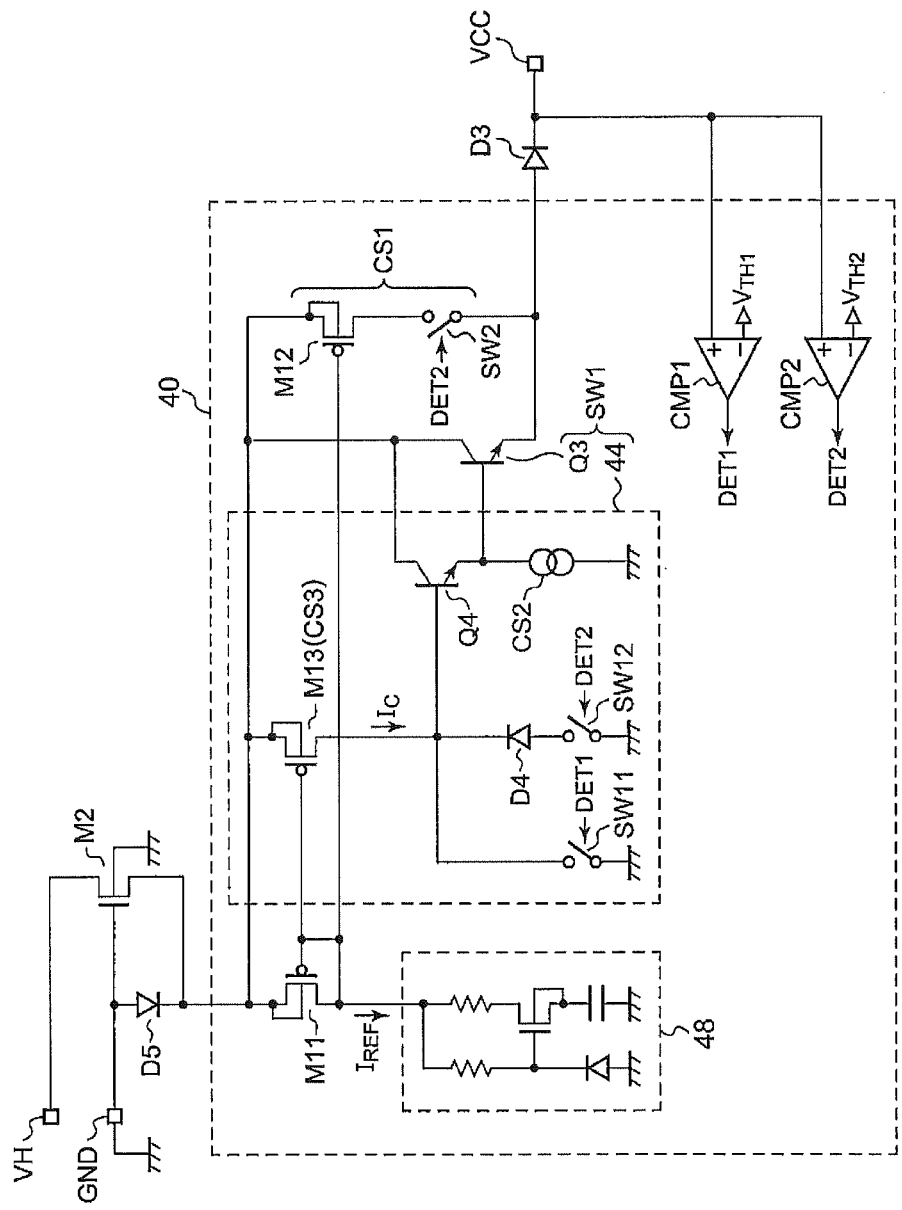
FIG. 4 is a circuit diagram showing a more specific configuration of a control circuit shown in FIG. 3.

FIG. 4 is a circuit diagram showing a more specific configuration of the control circuit 10 shown in FIG. 3. In FIG. 4, a block related to the generation of the switch signal OUT is omitted. A reference bias circuit 48 generates a reference current $I_{REF}$. A first transistor M11 is disposed in a path of the reference current $I_{REF}$. A second transistor M12 is connected to the first transistor M11, to form a current mirror circuit. A control switch SW2 is disposed in a path of the second transistor M12. The control switch SW2 is turned on when the second detection signal DET2 is at a high level. When the control switch SW2 is in the on state, a current $I_{LMT}$ flowing through the second transistor M12 is limited in proportion to the reference current $I_{REF}$. That is to say, the reference bias circuit 48, the first transistor M11, the second transistor M12, and the control switch SW2 form the first current source CS1.

The bypass switch SW1 includes a third transistor Q3 and a bias circuit 44. The third transistor Q3 is a NPN type bipolar transistor, which is connected to the charging transistor M2 in series, and disposed in the charging path between the high voltage terminal VH and the power supply terminal VCC. The bias circuit 44 controls a base current of the third transistor Q3, and controls the on state of the third transistor Q3.

The bias circuit 44 includes a fourth transistor Q4, a second current source CS2, a diode D4, a first switch SW11, and a second switch SW12. The fourth transistor Q4 is a NPN type bipolar transistor disposed between a base and a collector of the third transistor Q3. The second current source CS2 is disposed between the base of the third transistor Q3 and the ground terminal. The third current source CS3 supplies a current to a base of the fourth transistor Q4. The first switch SW11 is disposed between the base of the fourth transistor Q4 and the ground terminal, and is turned on when the first detection signal DET1 is at a high level. In addition, the second switch SW12 and the diode D4 are connected in series and disposed between the base of the fourth transistor Q4 and the ground terminal.

Figure 5:
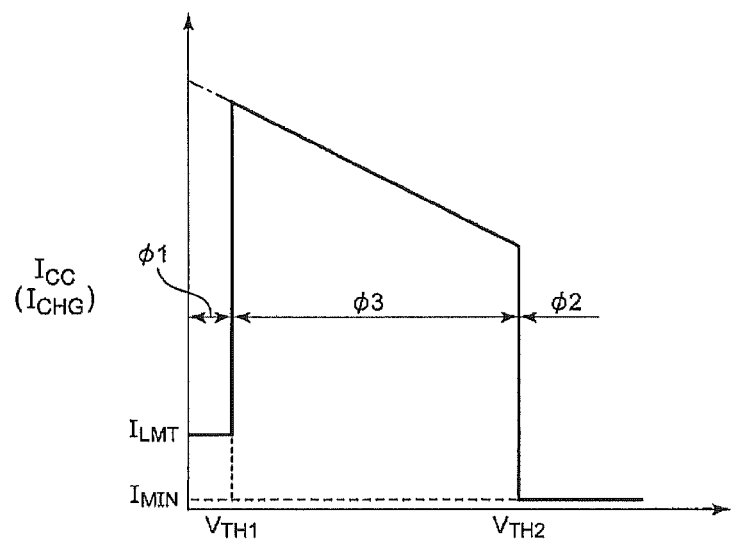
FIG. 5 shows a relation between a voltage of a power supply terminal and a charging current.

FIG. 5 shows a relation between the voltage $V_{CC}$ of the power supply terminal VCC and the charging current $I_{CHG}$.

By using the charging transistor M2 and the current limiting circuit 40 described in FIG. 2 to FIG. 4, the charging current $I_{CHG}$ is made to vary as shown by a solid line.

Figure 6:
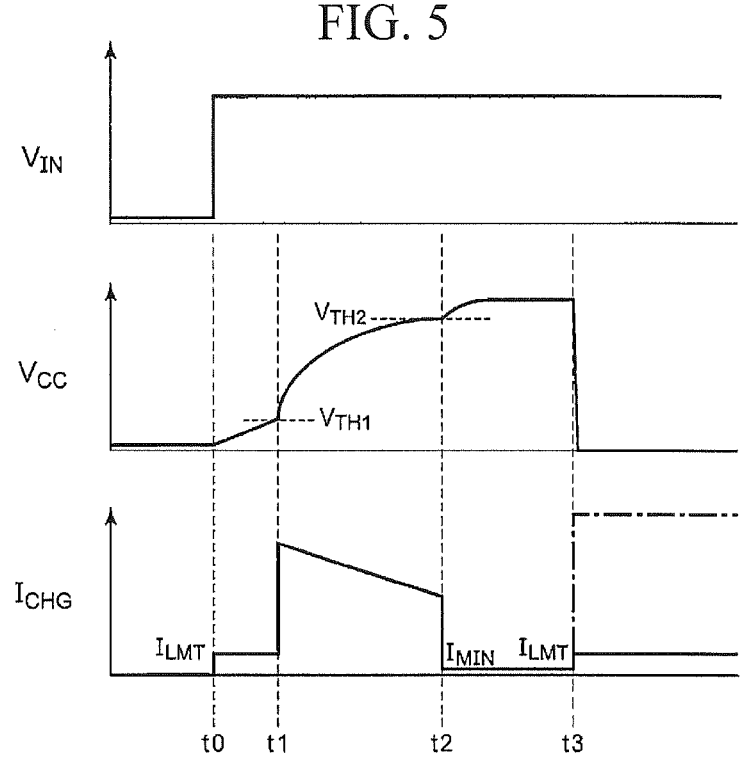
FIG. 6 is waveforms showing an action of an electronic device according to an embodiment.

The structure of the DC/DC converter 100 is described above. Then, an action of the DC/DC converter 100 is described. FIG. 6 is waveforms showing an action of the electronic device 1 according to the embodiment. Before a time t0, the electronic device 1 is turned off. If at the time t0, a user connects (starts) the electronic device 1 to a power supply, the input voltage $V_{IN}$ is supplied to the input terminal P1. After being just started, because $V_{CC}<V_{TH1}$ (the first state φ1), the charging current $I_{CHG}$ is limited to be the limited current $I_{LMT}$, and power supply voltage $V_{CC}$ rises slowly. If at a time t1, $V_{CC}>V_{TH1}$ (the third state φ3), the charging current $I_{CHG}$ increases as shown in FIG. 5, and a rise rate of the power supply voltage $V_{CC}$ is quickened. If at a time t2, $V_{CC}>V_{TH2}$ (the second state φ2), the charging current $I_{CHG}$ is reduced substantially to zero. If $V_{CC}>V_{TH2}$, the control circuit operates, and thus starts the switch of the switch transistor M1. As a result, the level of the power supply voltage $V_{CC}$ is adjusted and stabilized by the second converter instead of the charging path in the control circuit 10.

As described above, after the DC/DC converter 100 according to the embodiment is started, the DC/DC converter 100 can increase the power supply voltage $V_{CC}$ in a short time to the level $V_{UVLO}$ at which the control circuit 10 can operate. In addition, after the control circuit 10 begins to operate, because the charging current $I_{CHG}$ is substantially zero, the increase of current consumption can be inhibited. That is to say, the reduction of the starting time and the decrease of the power consumption can be achieved at the same time. This is a first advantage.

In addition, the DC/DC converter 100 according to the embodiment further has a second advantage described below. In the waveforms shown in FIG. 6, the power supply terminal VCC is set to be grounded at the time t3. In this case, because $V_{CC}<V_{TH1}$, the charging current $I_{CHG}$ decreases to the limited current $I_{LMT}$. Therefore, even if the ground state continuous for a long time, the generated heat can also be inhibited, thereby improving the reliability of the DC/DC converter 100. In other words, it is desirable to set the limited current $I_{LMT}$ to such a level that the reliability of the circuit is not deteriorated in case of ground fault.

Figure 7:
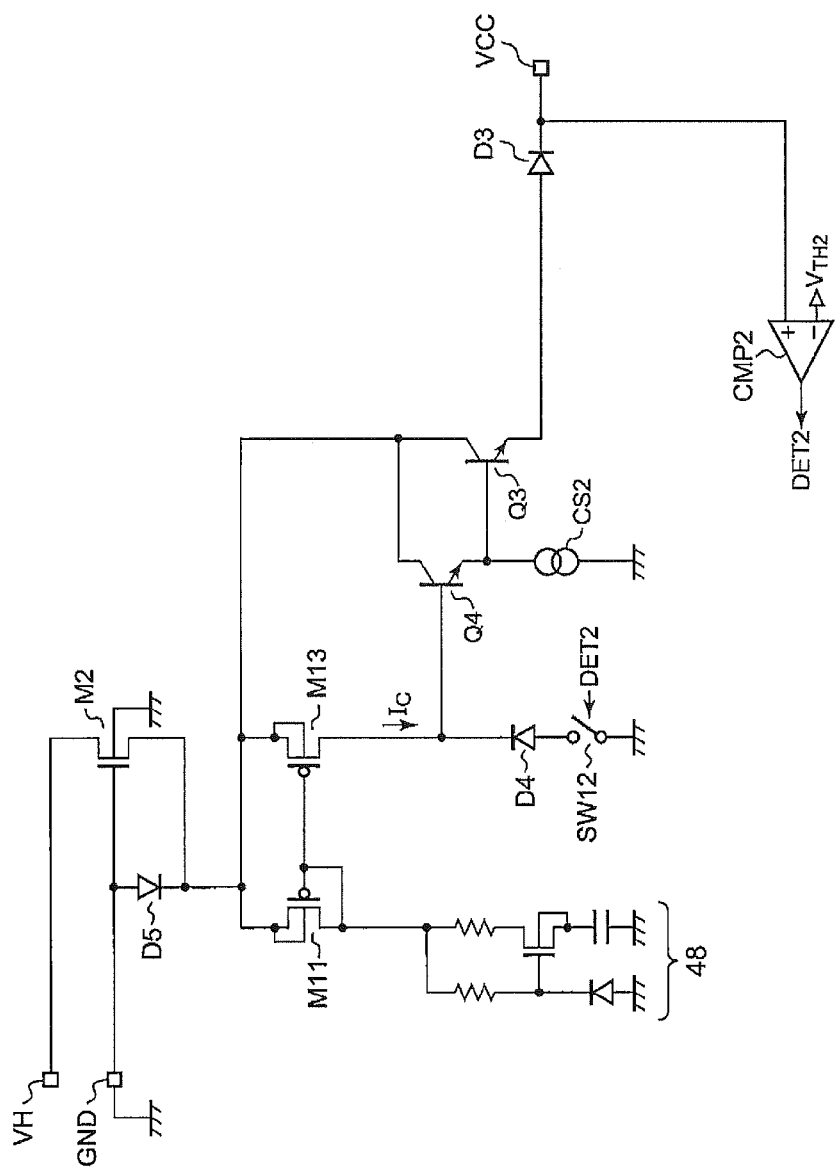
FIG. 7 is a circuit diagram showing another example of a configuration of a control circuit.

The second advantage becomes clear through comparison with a control circuit 10c shown in FIG. 7. The control circuit 10c in FIG. 7 is the control circuit 10 in FIG. 4 in which the first current source CS1, the first switch SW11, and the first comparator CMP1 are omitted. A single-dash dotted line in FIG. 5 represents a relation between the power supply voltage $V_{CC}$ of the control circuit 10c and the charging current $I_{CHG}$ in FIG. 7. That is to say, in the first state φ1, the charging current $I_{CHG}$ is not limited to the limited current $I_{LMT}$, and in the ground state ($V_{CC}=0$ V), the charging current $I_{CHG}$ is the largest. In FIG. 6, waveforms of the charging current $I_{CHG}$ in case that the control circuit 10c is grounded in FIG. 7 is represented by a single-dash dotted line, and a large charging current $I_{CHG}$ flows in the ground state.

Correspondingly, the control circuit 10 according to the embodiment can improve the reliability of the circuit in the ground state.

Hereinbefore, the invention is described based on embodiments. Those skilled in the art should understand that the embodiments are only exemplary, and various variations can be achieved with the combinations of the elements and processes in the embodiments, which fall in the scope of the invention. Hereinafter, the variations are described.

In the embodiments, a scenario in which the shunt regulator (the error amplifier) 22 is disposed on the secondary side of the transformer T1 is described; however, the error amplifier can also be disposed at the primary side, or in the control circuit 10.

It should be understood by those skilled in the art that various types of control circuits 10 exist, and the structure of the control circuit 10 is not a limitative structure in the invention.

For example, for the on signal generation portion 54 in FIG. 3, the comparator can be replaced by a timing circuit for determining the specified off time Toff. Alternatively, the off time Toff is fixed by pre-estimating a time requiring for releasing the energy. In this case, the circuit can be simplified to prevent the deterioration of the energy efficiency.

In the embodiment, a scenario in which the DC/DC converter 100 is used in the electronic device 1 is described; however, the invention is not limited thereto, the DC/DC converter 100 is applicable to various power supply apparatuses. For example, the DC/DC converter 100 can also be applied to an AC adaptor for supplying power to an electronic device. Examples of the electronic device include, but are not particularly limited to, a laptop computer, a desktop computer, a mobile phone terminal, and a CD player.

While the invention has been described and illustrated with reference to specific embodiments thereof, these descriptions and illustrations do not limit the invention. It should be understood by those skilled in the art that various changes may be made and equivalents may be substituted without departing from the true spirit and scope of the invention as defined by the appended claims. All such modifications are intended to be within the scope of the claims appended hereto.

What is claimed is:

1. A direct current (DC)/DC converter, comprising:
a transformer, comprising a primary coil having one terminal applied with an input voltage, a secondary coil, and an auxiliary coil disposed on the side of the primary coil;
a first output capacitor, having one terminal with a fixed electric potential, and the other terminal connected to an output terminal;
a first diode, having a cathode facing the first output capacitor and disposed between the other terminal of the first output capacitor and one terminal of the secondary coil;
a switch transistor, disposed in a path of the primary coil;
a second output capacitor, having one terminal with a fixed electric potential;
a second rectifier element, having a cathode facing the second output capacitor and disposed between the other terminal of the second output capacitor and one terminal of the auxiliary coil; and
a control circuit, for controlling the on/off of the switch transistor;
wherein the control circuit comprises:
a power supply terminal, connected to the other terminal of the second output capacitor;
a high voltage terminal, for inputting the input voltage;
a charging transistor, being a N-channel Metal Oxide Semiconductor Field Effect Transistor (MOSFET) that is disposed between the high voltage terminal and the power supply terminal, and applied with a bias so that the charging transistor is normally on; and
a current limiting circuit, for limiting a charging current flowing from the high voltage terminal through the charging transistor to the power supply terminal in a first state in which the voltage of the power supply terminal is lower than a specified first threshold voltage, and lowering the charging current substantially to zero in a second state in which the voltage of the power supply terminal is higher than a second threshold voltage that is specified to be higher than the first threshold voltage.

2. The DC/DC converter according to claim 1, wherein the current limiting circuit comprises:
a bypass switch, disposed in a path of the charging current between the high voltage terminal and the power supply terminal; and
a first current source, for supplying a specified current to the power supply terminal;
wherein in the first state, the bypass switch is turned off, and the first current source is turned on;
in the second state, the bypass switch and the first current source are both turned off; and
in a third state in which the voltage of the power supply terminal is higher than the first threshold voltage and lower than the second threshold voltage, at least the bypass switch is turned on.

3. The DC/DC converter according to claim 2, wherein the control circuit further comprises a first diode, having a cathode facing the power supply terminal and disposed between an output of the current limiting circuit and the power supply terminal.

4. The DC/DC converter according to claim 3, wherein the current limiting circuit further comprises:
a first comparator, for comparing the voltage of the power supply terminal with the first threshold voltage, to generate a first detection signal representing a comparison result; and
a second comparator, for comparing the voltage of the power supply terminal with the second threshold voltage, to generate a second detection signal representing a comparison result;
wherein the state of the current limiting circuit is controlled according to the first and second detection signal.

5. The DC/DC converter according to claim 2, wherein the first current source comprises:
a first transistor, disposed in a path of a reference current;
a second transistor, connected to the first transistor to form a current mirror circuit, and disposed between the high voltage terminal and the power supply terminal; and
a control switch, connected to the second transistor in series and disposed between the high voltage terminal and the power supply terminal.

6. The DC/DC converter according to claim 5, wherein the current limiting circuit further comprises:
a first comparator, for comparing the voltage of the power supply terminal with the first threshold voltage, to generate a first detection signal representing a comparison result; and
a second comparator, for comparing the voltage of the power supply terminal with the second threshold voltage, to generate a second detection signal representing a comparison result;
wherein the state of the current limiting circuit is controlled according to the first and second detection signal.

7. The DC/DC converter according to claim 2, wherein the bypass switch comprises:
a third transistor, being a NPN type bipolar transistor disposed in a path between the high voltage terminal and the power supply terminal; and
a bias circuit, for controlling a base current of the third transistor.

8. The DC/DC converter according to claim 7, wherein the bias circuit comprises:

a fourth transistor, being a NPN type bipolar transistor disposed between a base and a collector of the third transistor;

a second current source, disposed between the base of the third transistor and a ground terminal;

a third current source, for supplying a current to a base of the fourth transistor;

a first switch, disposed between the base of the fourth transistor and a ground terminal; and a second switch and a second diode, connected in series and disposed between the base of the fourth transistor and a ground terminal.

9. The DC/DC converter according to claim 8, wherein the current limiting circuit further comprises:

a first comparator, for comparing the voltage of the power supply terminal with the first threshold voltage, to generate a first detection signal representing a comparison result; and a second comparator, for comparing the voltage of the power supply terminal with the second threshold voltage, to generate a second detection signal representing a comparison result;

wherein the state of the current limiting circuit is controlled according to the first and second detection signal.

10. The DC/DC converter according to claim 7, wherein the current limiting circuit further comprises:

a first comparator, for comparing the voltage of the power supply terminal with the first threshold voltage, to generate a first detection signal representing a comparison result; and a second comparator, for comparing the voltage of the power supply terminal with the second threshold voltage, to generate a second detection signal representing a comparison result;

wherein the state of the current limiting circuit is controlled according to the first and second detection signal.

11. The DC/DC converter according to claim 2, wherein the current limiting circuit further comprises:

a first comparator, for comparing the voltage of the power supply terminal with the first threshold voltage, to generate a first detection signal representing a comparison result; and a second comparator, for comparing the voltage of the power supply terminal with the second threshold voltage, to generate a second detection signal representing a comparison result;

wherein the state of the current limiting circuit is controlled according to the first and second detection signal.

12. The DC/DC converter according to claim 1, wherein the control circuit further comprises a first diode, having a cathode facing the power supply terminal and disposed between an output of the current limiting circuit and the power supply terminal.

13. The DC/DC converter according to claim 12, wherein the current limiting circuit further comprises:

a first comparator, for comparing the voltage of the power supply terminal with the first threshold voltage, to generate a first detection signal representing a comparison result; and a second comparator, for comparing the voltage of the power supply terminal with the second threshold voltage, to generate a second detection signal representing a comparison result;

wherein the state of the current limiting circuit is controlled according to the first and second detection signal.

14. The DC/DC converter according to claim 1, wherein the current limiting circuit further comprises:

a first comparator, for comparing the voltage of the power supply terminal with the first threshold voltage, to generate a first detection signal representing a comparison result; and a second comparator, for comparing the voltage of the power supply terminal with the second threshold voltage, to generate a second detection signal representing a comparison result;

wherein the state of the current limiting circuit is controlled according to the first and second detection signal.

15. A power supply apparatus, comprising:

an alternating current (AC)/direct current (DC) converter, for converting a commercial AC voltage into a DC voltage; and the DC/DC converter according to claim 1, for receiving the DC voltage, reducing the DC voltage and supplying a reduced voltage to a load.

16. An electronic device, comprising:

a micro-computer; and the DC/DC converter according to claim 1, for supplying an output voltage to the micro-computer.

17. A direct current (DC)/DC converter, comprising:

a transformer, comprising a primary coil having one terminal applied with an input voltage, a secondary coil, and an auxiliary coil disposed on the side of the primary coil;

a first output capacitor, having one terminal with a fixed electric potential, and the other terminal connected to an output terminal;

a first diode, having a cathode facing the first output capacitor and disposed between the other terminal of the first output capacitor and one terminal of the secondary coil;

a switch transistor, disposed in a path of the primary coil;

a second output capacitor, having one terminal with a fixed electric potential;

a second rectifier element, having a cathode facing the second output capacitor and disposed between the other terminal of the second output capacitor and one terminal of the auxiliary coil; and a control circuit, for controlling the on/off of the switch transistor;

wherein the control circuit comprises:

a power supply terminal, connected to the other terminal of the second output capacitor;

a high voltage terminal, for inputting the input voltage; and a charging circuit, disposed between the high voltage terminal and the power supply terminal, for supplying a charging current to the second output capacitor connected to the power supply terminal when being started, wherein the lower the voltage of the power supply terminal is, the higher the charging current is generated when the voltage of the power supply terminal is higher than a specified first threshold voltage and lower than a specified second threshold voltage, the charging current is substantially lowered to zero when the voltage of the power supply terminal is higher than the second threshold voltage, and the charging current is limited to a specified limited current when the voltage of the power supply terminal is lower than the first threshold voltage.

* * * * *